United States Patent
Wang et al.

(10) Patent No.: US 10,320,543 B2
(45) Date of Patent: Jun. 11, 2019

(54) METHOD AND DEVICE FOR INDICATING CHANNEL STATE INFORMATION REFERENCE SIGNAL RESOURCE

(71) Applicant: CHINA MOBILE COMMUNICATIONS GROUP CO., LTD., Beijing (CN)

(72) Inventors: Fei Wang, Beijing (CN); Hui Tong, Beijing (CN); Jing Jin, Beijing (CN); Qixing Wang, Beijing (CN)

(73) Assignee: CHINA MOBILE COMMUNICATIONS GROUP CO., LTD., Beijing ( * ) Notice: Subject to any disclaimer, the term of this patent is extended or adjusted under 35 U.S.C. 154(b) by 0 days.

(21) Appl. No.: 15/752,583

(22) PCT Filed: Aug. 12, 2016

(86) PCT No.: PCT/CN2016/094876
§ 371 (c)(1),
(2) Date: Feb. 14, 2018

(87) PCT Pub. No.: WO2017/028749
PCT Pub. Date: Feb. 23, 2017

(65) Prior Publication Data
US 2018/0309555 A1    Oct. 25, 2018

(30) Foreign Application Priority Data
Aug. 19, 2015    (CN) .......................... 2015 1 0511386

(51) Int. Cl.
*H04B 7/06*    (2006.01)
*H04L 5/00*    (2006.01)
(Continued)

(52) U.S. Cl.
CPC .......... *H04L 5/0048* (2013.01); *H04L 5/0057* (2013.01); *H04W 72/042* (2013.01); *H04W 72/10* (2013.01)

(58) Field of Classification Search
CPC ....................................................... H04B 7/0206
See application file for complete search history.

(56) References Cited

U.S. PATENT DOCUMENTS

2012/0281567 A1    11/2012  Gao
2013/0077581 A1    3/2013   Lee
(Continued)

FOREIGN PATENT DOCUMENTS

CN    102111879 A    6/2011
CN    102684835 A    9/2012
(Continued)

OTHER PUBLICATIONS

International Search Report in international application No. PCT/CN2016/094876, dated Oct. 31, 2016.
(Continued)

*Primary Examiner* — Ayanah S George
(74) *Attorney, Agent, or Firm* — Syncoda LLC; Feng Ma (57) ABSTRACT

Provided are a method, device, and system for indicating a channel state information reference signal (CSI-RS) resource. A base station can configure one or more channel state information reference signal (CSI-RS) resources for a plurality of terminals within a cell covered by the base station, and can indicate a CSI-RS resource that can be used by each terminal in the plurality of terminal and belongs to the one or more CSI-RS resources, thereby enabling each terminal to perform measurement and feedback of channel state information according to the CSI-RS resource indicated by the base station by using a physical layer signal or a media access layer signal. In the present scheme, CSI-RS
(Continued)

configuration of terminals can be quickly and flexibly changed by introducing a physical layer signal or a media access layer signal, thereby reducing overheads of CSI-RS without affecting system performance.

12 Claims, 7 Drawing Sheets

(51) Int. Cl.
*H04W 72/04* (2009.01)
*H04W 72/10* (2009.01)

(56) References Cited

U.S. PATENT DOCUMENTS

| | | |
|---|---|---|
| 2013/0301450 A1 | 11/2013 | Geirhofer et al. |
| 2013/0343299 A1* | 12/2013 | Sayana ............... H04B 7/0417 370/329 |
| 2014/0044040 A1* | 2/2014 | Chen .................... H04W 24/02 370/328 |
| 2015/0049622 A1* | 2/2015 | Kim ...................... H04L 5/0053 370/252 |
| 2015/0098347 A1 | 4/2015 | Guo |
| 2015/0117385 A1 | 4/2015 | Lee et al. |

FOREIGN PATENT DOCUMENTS

| | | |
|---|---|---|
| CN | 103312434 A | 9/2013 |
| CN | 103391150 A | 11/2013 |
| CN | 103391174 A | 11/2013 |
| CN | 103516464 A | 1/2014 |
| CN | 104244319 A | 12/2014 |
| WO | 2012151064 A2 | 11/2012 |

OTHER PUBLICATIONS

English Translation of the Written Opinion of the International Search Authority in international application No. PCT/CN2016/094876, dated Oct. 31, 2016.
Supplementary European Search Report in European application No. 16836613.6, dated Jul. 12, 2018.
LG Electron I CS:"Beamformed CSI-RS related enhancements based on the identified approaches ",TE Des Lucioles ; F-06921 Sophia-Antipolis Cedex; France,vol. RAN WGI, No. Beijing, China; 20150824-20150828 Aug. 15, 2015 (Aug. 15, 2015), XP050994317,Retrieved from the Internet:URL:http://www.3gpp.org/ftp/tsg ran/WGI RL1/TSGRI S2/Docs/[retrieved on Aug. 15, 2015]paragraphs [0001], [02 .1],[02. 3] • [0003] [02.2].[02. 3] • [0003].
Specification Impacts of Beamformed CSI-RS Configuration, 3GPP TSG RAN WG1 Meeting #82 R1-154743 Beijing, China, Aug. 24-28, 2015.

* cited by examiner

METHOD AND DEVICE FOR INDICATING CHANNEL STATE INFORMATION REFERENCE SIGNAL RESOURCE

CROSS-REFERENCE TO RELATED APPLICATIONS

The present application claims the benefit to Chinese Application No. 201510511386.7, filed on Aug. 19, 2015, the contents of which are hereby incorporated by reference in its entirety.

TECHNICAL FIELD

The disclosure relates to the technical field of communications, and in particular to a method, equipment and system for indicating a Channel State Information Reference Signal (CSI-RS) resource.

BACKGROUND

An important issue in 3D-Multiple Input Multiple Output (3D-MIMO) is CSI measurement and feedback. At present, there mainly are two schemes as follows.

Figure 1:
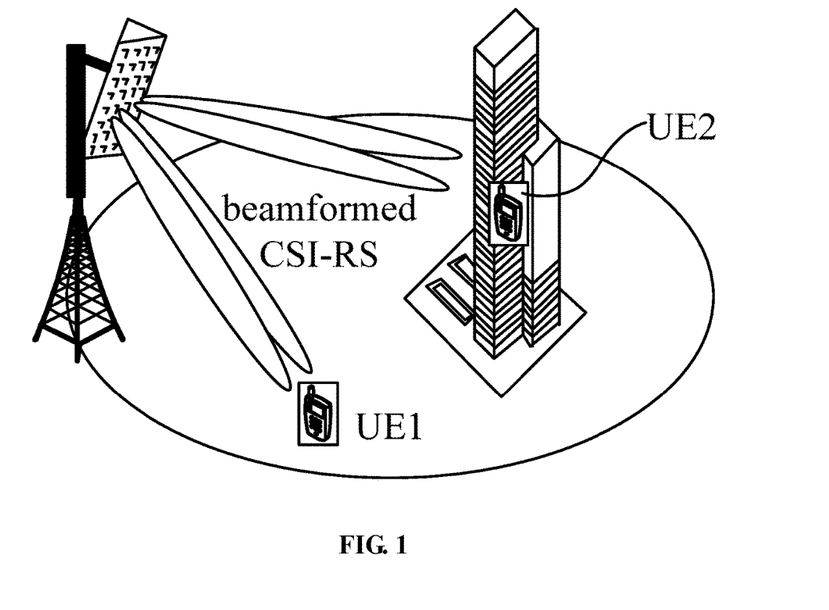
FIG. 1 shows a schematic diagram 1 of a CSI-RS measurement and feedback scheme.

The first scheme is a beamformed CSI-RS-based measurement and feedback scheme. Specifically, as shown in FIG. 1, in the present scheme, it is essentially necessary for an evolved Node B (eNB) to configure a User Equipment (UE) with one or more UE-specific beamformed CSI-RS resources, herein a UE-specific beamformed CSI-RS resource may be a Non-Zero Power (NZP) CSI-RS resource, or may be a CSI-RS port, or may be a CSI process, or may be a Discovery Reference Signal (DRS), or the like.

Figure 2:
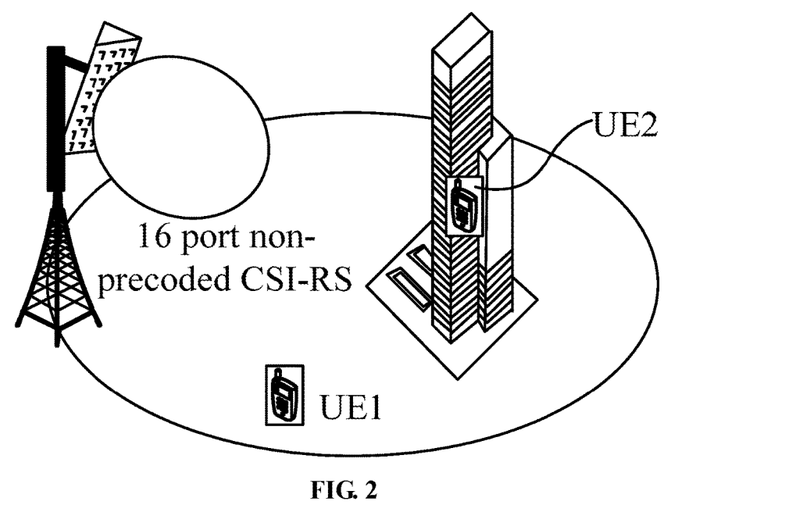
FIG. 2 shows a schematic diagram 2 of a CSI-RS measurement and feedback scheme.

The second scheme is a non-precoded CSI-RS-based measurement and feedback scheme. Specifically, as shown in FIG. 2, in the present scheme, a CSI-RS sent by an eNB to each UE of a cell covered by the eNB is a cell-specific non-precoded CSI-RS, that is, CSI-RSs measured by an indefinite number of UEs in the cell covered by the eNB are the same, and depend on a port number.

Besides, the second scheme usually needs to design a complex 16/32/64 port codebook, and the first scheme does not necessarily need to design a 16/32/64 port codebook, may be implemented by channel reciprocity and is particularly applied to a Time-Division Duplex (TDD) system, so that the first scheme is superior to the second scheme in terms of a codebook resource, and furthermore, the first scheme is superior to the second scheme in terms of CSI-RS coverage performance.

However, in terms of CSI-RS overheads, the second scheme usually adopts a cell-specific non-precoded CSI-RS, that is, CSI-RSs measured by an indefinite number of UEs in a cell are the same, and depend on a port number. The first scheme adopts a UE-specific beamformed CSI-RS, that is, CSI-RSs measured by different UEs are different, such that in the presence of a small number of UEs, CSI-RS overheads of the first scheme are lower than those of the second scheme. However, as UEs are increasing, the number of CSI-RSs needed by the first scheme will be increased in proportion. When the number of the UEs is increased to a certain extent, the CSI-RS overheads of the first scheme will be much higher than those of the second scheme.

As a result, a current technical problem to be urgently solved is how to reduce CSI-RS overheads of the first scheme, particularly, CSI-RS overheads of the first scheme in the presence of a large number of UEs so as to maintain the advantages of the first scheme as usual.

SUMMARY

An embodiment of the disclosure provides a method for indicating a CSI-RS resource, used to flexibly configure a CSI-RS to reduce overheads of the CSI-RS.

Specifically, the embodiments of the disclosure provide a method for indicating a CSI-RS resource, including: an eNB configures one or more CSI-RS resources for a plurality of UEs within a cell covered by the eNB; and the eNB indicates a CSI-RS resource that can be used by at least one of the plurality of UEs and pertains to the one or more CSI-RS resources, so that the at least one UE performs CSI measurement and feedback according to the CSI-RS resource indicated by the eNB.

In an embodiment, the CSI-RS resource is not limited to the following resources: CSI Process, or NZP CSI-RS resource, or CSI-RS port(s).

In an embodiment, if each of the one or more CSI-RS resources is a CSI Process, the one or more CSI-RS resources are configured for the plurality of UEs by the eNB in the following manners: set partitioning is performed on the plurality of UEs to obtain one or more UE sets, and a CSI Process Group containing one or more CSI Processes is configured for each UE set, herein when a plurality of CSI Process Groups is configured for the plurality of UEs, CSI Processes contained in any two of the plurality of configured CSI Process Groups are partially the same or totally different.

In an embodiment, when the eNB configures one or more CSI Process Groups for the plurality of UEs, the operation of indicating the CSI-RS resource that can be used by at least one of the plurality of UEs and pertains to the one or more CSI-RS resources via physical layer signaling includes: a CSI-Process that can be used by at least one of the plurality of UEs and pertains to a CSI Process Group corresponding to the at least one UE is indicated.

In an embodiment, the operation of indicating the CSI-Process that can be used by at least one of the plurality of UEs and pertains to a CSI Process Group corresponding to the at least one UE includes: if any UE has a demand for service transmission and a priority of the service transmission is not lower than a set threshold the UE is instructed to use, for CSI measurement and feedback, any CSI Process that has not yet been indicated to other UEs within the cell covered by the eNB and pertains to a CSI Process Group corresponding to the UE; or, if any UE does not have a demand for service transmission, or the UE has a demand for service transmission but the priority of the service transmission is lower than a set threshold, the UE is instructed not to use, for CSI measurement and feedback, any CSI Process in a CSI Process Group corresponding to the UE.

In an embodiment, the operation of indicating the CSI-RS resource that can be used by at least one of the plurality of UEs and pertains to the one or more CSI-RS resources specifically includes: the CSI-RS resource that can be used by at least one of the plurality of UEs and pertains to the one or more CSI-RS resources is indicated via physical layer signaling or Medium Access Control (MAC) signaling.

In an embodiment, the physical layer signaling is not limited to the following signaling: Downlink Control Indicator (DCI).

Further, if the physical layer signaling is a DCI, the operation of indicating the CSI-RS resource that can be used by at least one of the plurality of UEs and pertains to the one or more CSI-RS resources via physical layer signaling includes: the CSI-RS resource that can be used by at least one of the plurality of UEs and pertains to the one or more CSI-RS resources is indicated via an enhanced DCI format, or, the CSI-RS resource that can be used by at least one of the plurality of UEs and pertains to the one or more CSI-RS resources is indicated via a newly-added DCI format.

Further, the embodiments of the disclosure also provide another method for indicating a CSI-RS resource, including: a UE receives a CSI-RS resource indicator issued by an eNB, the CSI-RS resource indicator being used to indicate a CSI-RS resource that can be used by the UE and pertains to one or more CSI-RS resources configured by the eNB for a plurality of UEs within a cell covered by the eNB; and CSI measurement and feedback is performed according to the CSI-RS resource indicated by the eNB.

In an embodiment, the CSI-RS resource is not limited to the following resources: CSI Process, or NZP CSI-RS resource, or CSI-RS port(s).

In an embodiment, if each of the one or more CSI-RS resources is a CSI Process, the one or more CSI-RS resources are configured for the plurality of UEs by the eNB in the following manners: set partitioning is performed on the plurality of UEs to obtain one or more UE sets, and a CSI Process Group containing one or more CSI Processes is configured for each UE set, herein when a plurality of CSI Process Groups is configured for the plurality of UEs, CSI Processes contained in any two of the plurality of configured CSI Process Groups are partially the same or totally different.

Further, the embodiments of the disclosure also provide an eNB, including: a resource configuration unit arranged to configure one or more CSI-RS resources for a plurality of UEs within a cell covered by the eNB; and a resource indication unit arranged to indicate a CSI-RS resource that can be used by at least one of the plurality of UEs and pertains to the one or more CSI-RS resources, so that the at least one UE performs CSI measurement and feedback according to the CSI-RS resource indicated by the eNB.

In an embodiment, the CSI-RS resource is not limited to the following resources: CSI Process, or, NZP CSI-RS resource, or CSI-RS port(s).

Further, the resource configuration unit is specifically arranged to: perform set partitioning on the plurality of UEs to obtain one or more UE sets, and configure a CSI Process Group containing one or more CSI Processes for each UE set, herein when a plurality of CSI Process Groups is configured for the plurality of UEs, CSI Processes contained in any two of the plurality of configured CSI Process Groups are partially the same or totally different.

Further, the resource indication unit is specifically arranged to, when the eNB configures one or more CSI Process Groups for the plurality of UEs, indicate a CSI-Process that can be used by at least one of the plurality of UEs and pertains to a CSI Process Group corresponding to the at least one UE.

Further, the resource indication unit is specifically arranged to: if any UE has a demand for service transmission and a priority of the service transmission is not lower than a set threshold, instruct the UE to use, for CSI measurement and feedback, any CSI Process that has not yet been indicated to other UEs within the cell covered by the eNB and pertains to a CSI Process Group corresponding to the UE; or, if any UE does not have a demand for service transmission or the UE has a demand for service transmission but the priority of the service transmission is lower than a set threshold, instruct the UE not to use, for CSI measurement and feedback, any CSI Process in a CSI Process Group corresponding to the UE.

In an embodiment, the resource indication unit is specifically arranged to: indicate the CSI-RS resource that can be used by at least one of the plurality of UEs and pertains to the one or more CSI-RS resources via physical layer signaling or MAC signaling.

In an embodiment, the physical layer signaling is not limited to the following signaling: DCI.

Further, the resource indication unit is specifically arranged to: indicate the CSI-RS resource that can be used by at least one of the plurality of UEs and pertains to the one or more CSI-RS resources via an enhanced DCI format, or, indicate the CSI-RS resource that can be used by at least one of the plurality of UEs and pertains to the one or more CSI-RS resources via a newly-added DCI format.

Further, the embodiments of the disclosure provide a UE, including: a receiving module arranged to receive a CSI-RS resource indicator issued by an eNB, the CSI-RS resource indicator being used to indicate a CSI-RS resource that can be used by the UE and pertains to one or more CSI-RS resources configured by the eNB for a plurality of UEs within a cell covered by the eNB; and an execution module arranged to perform CSI measurement and feedback according to the CSI-RS resource indicated by the eNB.

In an embodiment, the CSI-RS resource is not limited to the following resources: CSI Process, or, NZP CSI-RS resource, or CSI-RS port(s).

In an embodiment, if each of the one or more CSI-RS resources is a CSI Process, the one or more CSI-RS resources are configured for the plurality of UEs by the eNB in the following manners: performing set partitioning on the plurality of UEs to obtain one or more UE sets, and configuring a CSI Process Group containing one or more CSI Processes for each UE set, herein when a plurality of CSI Process Groups is configured for the plurality of UEs, CSI Processes contained in any two of the plurality of configured CSI Process Groups are partially the same or totally different.

Further, the embodiment of the disclosure also provides a system for indicating a CSI-RS resource, including: an eNB arranged to configure one or more CSI-RS resources for a plurality of UEs within a cell covered by the eNB, and indicate a CSI-RS resource that can be used by at least one of the plurality of UEs and pertains to the one or more CSI-RS resources; and a UE arranged to perform CSI measurement and feedback according to the CSI-RS resource indicated by the eNB.

The disclosure has beneficial effects as follows. The embodiment of the disclosure provides a method, equipment and system for indicating a CSI-RS resource. In the technical scheme of the embodiment of the disclosure, an eNB may configure one or more CSI-RS resources for a plurality of UEs within a cell covered by the eNB, and may indicate a CSI-RS resource that can be used by each UE in the plurality of UEs and pertains to the one or more CSI-RS resources, thereby enabling each UE to perform CSI measurement and feedback according to the CSI-RS resource indicated by the eNB via physical layer signaling or MAC signaling. That is, in the technical scheme of the embodiment of the disclosure, CSI-RS configurations of a UE may be quickly and flexibly changed by introducing physical layer signaling or MAC signaling, thereby reducing overheads of a CSI-RS without affecting system performance, particularly, reducing the overheads of the CSI-RS in the presence of a large number of UEs.

BRIEF DESCRIPTION OF THE DRAWINGS

In order to more clearly describe the technical scheme in the embodiment of the disclosure, drawings needing to be used in description of the embodiment will be simply introduced. Apparently, the drawings described below are merely some embodiments of the disclosure. On the premise of no creative work, those of ordinary skill in the art may also obtain other drawings according to these drawings.

DETAILED DESCRIPTION

Actually, user data arrives fitfully, that is, after a segment of data is transmitted and before another segment of data does not arrive, an eNB does not need to frequently send a CSI-RS to a UE, and besides, different segments of user data are inconsistent in arrival time. Thus, if the eNB can configure a CSI-RS for a user having a data transmission requirement in real time and invalidates a CSI-RS of a user who does not have a data transmission requirement, that is, if the eNB flexibly configures a CSI-RS, CSI-RS overheads of the whole system may be greatly reduced.

However, in a current standard, CSI-RS configuration information of each UE is notified by high-layer signaling (such as Radio Resource Control (RRC) signaling), and once these parameters are configured via RRC, it means that the eNB needs to send corresponding reference signals according to corresponding configurations, if the eNB is intended to change or invalidate these configurations, it is necessary to implement via high-layer signaling, and the time of effectiveness is dozens to hundreds of microseconds usually. Thus, if there may be no available CSI-RSs in case of data arrival due to the fact that CSI-RS configuration information is released via high-layer signaling, the purposes of configuring a CSI-RS for a user having a data transmission requirement in real time and invalidating a CSI-RS of a user who does not have a data transmission requirement cannot be achieved according to the current standard.

Based on this, the embodiment of the disclosure provides a method, equipment and system for indicating a CSI-RS resource. In the technical scheme of the embodiment of the disclosure, an eNB may configure one or more CSI-RS resources for a plurality of UEs within a cell covered by the eNB, and may indicate a CSI-RS resource that can be used by each UE in the plurality of UEs and pertains to the one or more CSI-RS resources, thereby enabling each UE to perform CSI measurement and feedback according to the CSI-RS resource indicated by the eNB via physical layer signaling or MAC signaling. That is, in the technical scheme of the embodiment of the disclosure, CSI-RS configurations of a UE may be quickly and flexibly changed by introducing physical layer signaling or MAC signaling, thereby reducing overheads of a CSI-RS without affecting system performance, particularly, reducing the overheads of the CSI-RS in the presence of a large number of UEs.

In order to achieve clearer purposes, technical schemes and advantages of the disclosure, the disclosure will be further described below in conjunction with the drawings in detail, and apparently, the described embodiments are merely part of the embodiments of the disclosure, not all of the embodiments. Based on the embodiments of the disclosure, all other embodiments obtained without making creative works by those of ordinary skill in the art fall within the scope of protection of the disclosure.

The embodiment of the disclosure provides a method for indicating a CSI-RS resource, specifically including: configuring, by an eNB, one or more CSI-RS resources for a plurality of UEs within a cell covered by the eNB; and indicating a CSI-RS resource that can be used by at least one of the plurality of UEs and pertains to the one or more CSI-RS resources.

Figure 3:
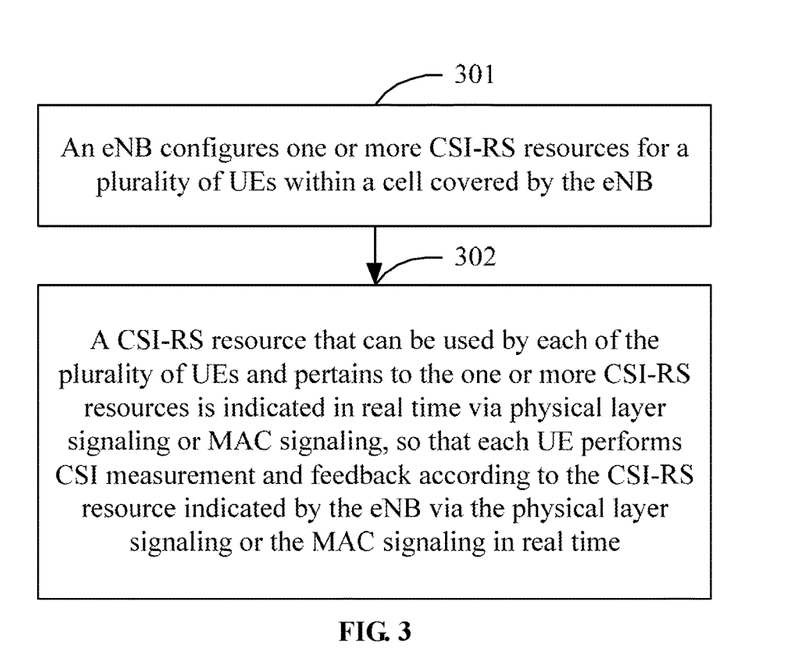
FIG. 3 shows a flow diagram of a method for indicating a CSI-RS resource according to some embodiments of the disclosure.

Specifically, in one embodiment, as shown in FIG. 3 (showing a flow diagram of the method for indicating a CSI-RS resource), the method for indicating a CSI-RS resource includes the following steps.

In Step 301, an eNB configures one or more CSI-RS resources for a plurality of UEs within a cell covered by the eNB.

Specifically, similar to a current standard, the eNB may configure one or more CSI-RS resources for a plurality of UEs within a cell covered by the eNB via high-layer signaling (such as RRC signaling). Besides, it should be noted that the eNB may specifically configure one or more CSI-RS resources for a plurality of UEs within a cell covered by the eNB according to service statistics situations of each UE within the cell covered by the eNB.

Alternatively, the CSI-RS resource includes, but not limited to, the following resources:

CSI Process, or NZP CSI-RS resource, or CSI-RS port(s), or DRS.

Further, if each of the one or more CSI-RS resources configured by an eNB for a plurality of UEs within a cell covered by the eNB is a CSI Process, the one or more CSI-RS resources may be configured for the plurality of UEs by the eNB in the following manners:

performing set partitioning on the plurality of UEs to obtain one or more UE sets, and configuring a CSI Process Group containing one or more CSI Processes for each UE set, herein when a plurality of CSI Process Groups is configured for the plurality of UEs, CSI Processes contained in any two of the plurality of configured CSI Process Groups are partially the same or totally different.

Besides, it should be noted that the quantity of CSI Processes in a CSI Process Group configured for each UE set by the eNB may usually be smaller than the quantity of UEs contained in the UE set. That is, finally, the quantity of CSI-RS resources configured by the eNB for a plurality of UEs within a cell covered by the eNB may usually be smaller than the quantity of UEs within the cell covered by the eNB. No repeated description is given in the embodiment of the disclosure.

Furthermore, it should be noted that in the embodiment of the disclosure, the definition of a CSI Process may be the same as the definition in a current R12 standard or may be further enhanced. Moreover, each CSI Process may include at least one NZP CSI-RS resource and at least one CSI-IM resource. No repeated description is given in the embodiment of the disclosure.

In Step 302, a CSI-RS resource that can be used by each UE in the plurality of UEs and pertains to the one or more CSI-RS resources is indicated in real time via physical layer signaling or MAC signaling, thereby enabling each UE to perform CSI measurement and feedback according to the CSI-RS resource indicated by the eNB via the physical layer signaling or the MAC signaling in real time.

That is to say, in the technical scheme of the embodiment of the disclosure, CSI-RS configurations of a UE may be quickly and flexibly changed by introducing physical layer signaling or MAC signaling, thereby reducing overheads of a CSI-RS without affecting system performance.

Alternatively, if the eNB configures one or more CSI Process Groups for the plurality of UEs, the operation of indicating a CSI-RS resource that can be used by each UE in the plurality of UEs and pertains to the one or more CSI-RS resources via physical layer signaling or MAC signaling in real time may include:

indicating the CSI-Process that can be used by each UE in the plurality of UEs and pertains to a CSI Process Group via physical layer signaling or MAC signaling in real time.

Further, the operation of indicating a CSI-Process that can be used by each UE in the plurality of UEs and pertains to a CSI Process Group corresponding to each UE via physical layer signaling or MAC signaling in real time may include:

if it is determined that any UE has a demand for service transmission and a priority of service transmission is not lower than a set threshold (the set threshold may be flexibly set according to a practical situation) at a next time interval according to the demand for service transmission of the UE, instructing the UE to use, for CSI measurement and feedback, any CSI Process that has not yet been indicated to other UEs within the cell covered by the eNB and pertains to a CSI Process Group corresponding to the UE via physical layer signaling or MAC signaling; or, if it is determined that any UE does not have a demand for service transmission, or the UE has a demand for service transmission but the priority of the service transmission is lower than a set threshold at a next time interval according to the demand for service transmission of the UE, instructing the UE not to use, for CSI measurement and feedback, any CSI Process in a CSI Process Group corresponding to the UE via physical layer signaling or MAC signaling.

Further, the physical layer signaling includes, but not limited to, the following signaling: DCI, as long as it can implement real-time indication functions to be implemented in the embodiment of the disclosure. Besides, it should be noted that the MAC signaling includes, but not limited to, an MAC data packet header, as long as it can implement real-time indication functions to be implemented in the embodiment of the disclosure. No repeated description is given in the embodiment of the disclosure.

Alternatively, if the physical layer signaling is a DCI, the operation of indicating a CSI-RS resource that can be used by each UE in the plurality of UEs and pertains to the one or more CSI-RS resources via physical layer signaling in real time may include:

indicating a CSI-RS resource that can be used by each UE in the plurality of UEs and pertains to the one or more CSI-RS resources via an enhanced DCI format in real time, or, indicating a CSI-RS resource that can be used by each UE in the plurality of UEs and pertains to the one or more CSI-RS resources via a newly-added DCI format in real time.

Herein, the enhanced DCI format may be a DCI scrambled by a Radio Network Temporary Identity (RNTI). No repeated description is given in the embodiment of the disclosure.

That is to say, in the embodiment of the disclosure, when an eNB instructs a certain UE to use a certain one or more CSI-RS resources in one or more CSI-RS resources allocated by the eNB to a plurality of UEs within a cell covered by the eNB via physical layer DCI signaling in real time, the operation may be implemented by enhancing a current DCI format or adding a new DCI format. No repeated description is given in the embodiment of the disclosure.

The method for indicating a CSI-RS resource in the above-mentioned embodiments of the disclosure will be specifically illustrated below with two specific examples.

EXAMPLE 1

It is assumed that a cell covered by an eNB has 20 UEs, and it is also assumed that the eNB may make the following configurations for each UE via high-layer signaling according to a service statistics situation of each UE.

The eNB configures a CSI Process Group 1 for {UE1, UE2, UE3, UE4}, the CSI Process Group 1 including {CSI Process 1, CSI Process 2}. Besides, the eNB may simultaneously indicate that initial states of these CSI Processes are disable via high-layer signaling.

The eNB configures a CSI Process Group 2 for {UE5, UE6, UE7, UE8}, the CSI Process Group 2 including {CSI Process 3, CSI Process 4}. Besides, the eNB may simultaneously indicate that initial states of these CSI Processes are disable via high-layer signaling.

The eNB configures a CSI Process Group 3 for {UE9, UE10, UE11, UE12}, the CSI Process Group 3 including {CSI Process 5, CSI Process 6}. Besides, the eNB may simultaneously indicate that initial states of these CSI Processes are disable via high-layer signaling.

The eNB configures a CSI Process Group 4 for {UE13, UE14, UE15, UE16}, the CSI Process Group 4 including {CSI Process 7, CSI Process 8}. Besides, the eNB may simultaneously indicate that initial states of these CSI Processes are disable via high-layer signaling.

The eNB configures a CSI Process Group 5 for {UE17, UE18, UE19, UE20}, the CSI Process Group 5 including {CSI Process 9, CSI Process 10}. Besides, the eNB may simultaneously indicate that initial states of these CSI Processes are disable via high-layer signaling.

So, the eNB may indicate a certain one or more CIS Processes that are used by a certain UE and pertain to a corresponding CSI Process Group via physical layer DCI signaling in real time according to a demand for service transmission of each UE in the following manners.

For example, if the eNB determines, at T1, that UE1 has a demand for service transmission whilst UE2, UE3 and UE4 do not have a demand for service transmission within a next period of time, the eNB may instruct UE1 to use, for CSI measurement and feedback, the CSI Process 1 in the CSI Process Group 1 via DCI, and instruct UE2, UE3 and UE4 not to use, for CSI measurement and feedback, any CSI Process in the CSI Process Group 1 via DCI; or, for example, if the eNB determines, at T2, that UE1 and UE4 do not have a demand for service transmission whilst UE2 and UE3 have a demand for service transmission within a next period of time, the eNB may instruct UE1 and UE4 not to use, for CSI measurement and feedback, any CSI Process in the CSI Process Group 1 via DCI, instruct UE2 to use, for CSI measurement and feedback, the CSI Process 1 in the CSI Process Group 1 via DCI, and instruct UE3 to use, for CSI measurement and feedback, the CSI Process 2 in the CSI Process Group 1 via DCI; or, for example, if the eNB determines, at T3, that UE4 does not have a demand for service transmission whilst UE1, UE2 and UE3 have a demand for service transmission within a next period of time and a service transmission priority of UE2 is relatively low, the eNB may instruct UE2 and UE4 not to use, for CSI measurement and feedback, any CSI Process in the CSI Process Group 1 via DCI, instruct UE1 to use, for CSI measurement and feedback, the CSI Process 1 in the CSI Process Group 1 via DCI, and instruct UE3 to use, for CSI measurement and feedback, the CSI Process 2 in the CSI Process Group 1 via DCI; after a period of time, the eNB may instruct UE2 to use, for CSI measurement and feedback, the CSI Process 1 in the CSI Process Group 1 via DCI, and instruct UE1 not to use, for CSI measurement and feedback, any CSI Process in the CSI Process Group 1 via DCI.

Besides, it should be noted that when the quantity of CSI Processes that are contained in the CSI Process Group 1 corresponding to {UE1, UE2, UE3, UE4} and have not yet been indicated to other UEs within the cell covered by the eNB is not smaller than the quantity of UEs having a demand for service transmission in {UE1, UE2, UE3, UE4} within a next period of time, the eNB may instruct each UE having a demand for service transmission in {UE1, UE2, UE3, UE4} to use, for CSI measurement and feedback, a corresponding available CSI Process in the CSI Process Group 1 via DCI. That is, the set threshold may be set as a smaller threshold, in order that each UE having a demand for service transmission may use the corresponding CSI Process for CSI measurement and feedback. No repeated description is given in the embodiment of the disclosure.

EXAMPLE 2

It is assumed that a cell covered by an eNB has 20 UEs, and it is also assumed that the eNB may make the following configurations for each UE via high-layer signaling according to a service statistics situation of each UE.

The eNB configures a CSI Process Group 1 for {UE1, UE2, UE3, UE4, UE5}, the CSI Process Group 1 including {CSI Process 1, CSI Process 2, CSI Process 3, CSI Process 4}. Besides, the eNB may simultaneously indicate that initial states of these CSI Processes are disable via high-layer signaling.

The eNB configures a CSI Process Group 2 for {UE6, UE7, UE8, UE9, UE10}, the CSI Process Group 2 including {CSI Process 3, CSI Process 4, CSI Process 5, CSI Process 6}. Besides, the eNB may simultaneously indicate that initial states of these CSI Processes are disable via high-layer signaling.

The eNB configures a CSI Process Group 3 for {UE11, UE12, UE13, UE14, UE15}, the CSI Process Group 3 including {CSI Process 5, CSI Process 6, CSI Process 7, CSI Process 8}. Besides, the eNB may simultaneously indicate that initial states of these CSI Processes are disable via high-layer signaling.

The eNB configures a CSI Process Group 4 for {UE16, UE17, UE18, UE19, UE20}, the CSI Process Group 4 including {CSI Process 7, CSI Process 8, CSI Process 9, CSI Process 10}. Besides, the eNB may simultaneously indicate that initial states of these CSI Processes are disable via high-layer signaling.

So, the eNB may indicate a certain one or more CIS Processes that are used by a certain UE and pertain to a corresponding CSI Process Group via physical layer DCI signaling in real time according to a demand for service transmission of each UE in the following manners.

For example, if the eNB determines, at T1, that UE1, UE2, UE3, UE6 and UE7 have a demand for service transmission whilst UE4, UE5, UE8, UE9 and UE10 do not have a demand for service transmission within a next period of time, the eNB may instruct UE1, UE2, UE3, UE6 and UE7 to respectively use, for CSI measurement and feedback, the CSI Process 1 in the CSI Process Group 1, the CSI Process 2 in the CSI Process Group 1, the CSI Process 3 in the CSI Process Group 1, the CSI Process 4 in the CSI Process Group 2 and the CSI Process 5 in the CSI Process Group 2 via DCI, instruct UE4 and UE5 not to use, for CSI measurement and feedback, any CSI Process in the CSI Process Group 1 via DCI, and instruct UE8, UE9 and UE10 not to use, for CSI measurement and feedback, any CSI Process in the CSI Process Group 2 via DCI.

The embodiment of the disclosure provides a method for indicating a CSI-RS resource. In the technical scheme of the embodiment of the disclosure, an eNB may configure one or more CSI-RS resources for a plurality of UEs within a cell covered by the eNB, and may indicate a CSI-RS resource that can be used by each UE in the plurality of UEs and pertains to the one or more CSI-RS resources via physical layer signaling or MAC signaling in real time, thereby enabling each UE to perform CSI measurement and feedback according to the CSI-RS resource indicated by the eNB via physical layer signaling or MAC signaling in real time. That is, in the technical scheme of the embodiment of the disclosure, CSI-RS configurations of a UE may be quickly and flexibly changed by introducing physical layer signaling or MAC signaling, thereby reducing overheads of a CSI-RS without affecting system performance, particularly, reducing the overheads of the CSI-RS in the presence of a large number of UEs.

Based on the same inventive concept, the embodiment of the disclosure also provides another method, executed by a UE, for indicating a CSI-RS resource, including: the UE receives a CSI-RS resource indicator issued by an eNB, the CSI-RS resource indicator being used to indicate a CSI-RS resource that can be used by the UE and pertains to one or more CSI-RS resources configured by the eNB for a plurality of UEs within a cell covered by the eNB; and CSI measurement and feedback is performed according to the CSI-RS resource indicated by the eNB.

Figure 4:
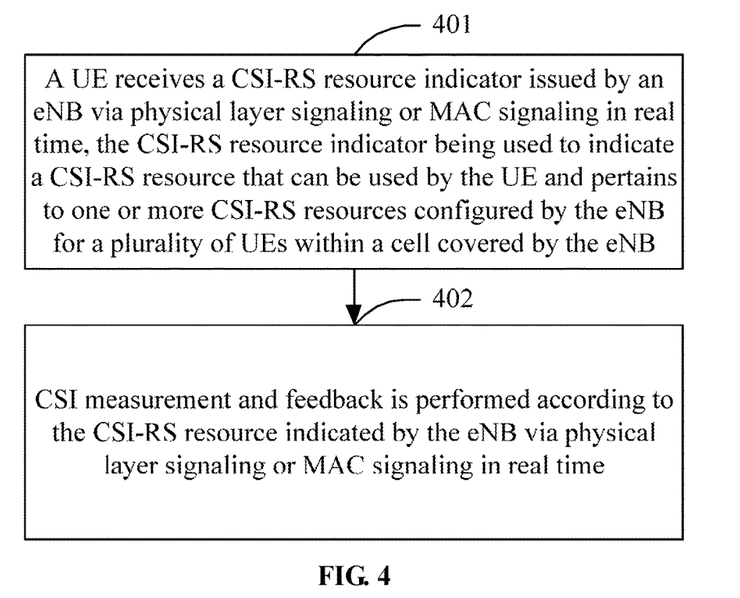
FIG. 4 shows a flow diagram of a method for indicating a CSI-RS resource according to some embodiments of the disclosure.

Specifically, in one embodiment, as shown in FIG. 4 (showing a flow diagram of the method for indicating a CSI-RS resource), the method for indicating a CSI-RS resource may include the steps as follows.

In Step 401, a UE receives a CSI-RS resource indicator issued by an eNB via physical layer signaling or MAC signaling in real time, the CSI-RS resource indicator being used to indicate a CSI-RS resource that can be used by the UE and pertains to one or more CSI-RS resources configured by the eNB for a plurality of UEs within a cell covered by the eNB.

In Step 402, CSI measurement and feedback is performed according to the CSI-RS resource indicated by the eNB via physical layer signaling or MAC signaling in real time.

Alternatively, the CSI-RS resource includes, but not limited to, the following resources:

CSI Process, or NZP CSI-RS resource, or CSI-RS port(s), or DRS. Further, if each of the one or more CSI-RS resources is a CSI Process, the one or more CSI-RS resources may be configured for the plurality of UEs by the eNB in the following manners:

performing set partitioning on the plurality of UEs to obtain one or more UE sets, and configuring a CSI Process Group containing one or more CSI Processes for each UE set, herein when a plurality of CSI Process Groups is configured for the plurality of UEs, CSI Processes contained in any two of the plurality of configured CSI Process Groups are partially the same or totally different.

Besides, it should be noted that the quantity of CSI Processes in a CSI Process Group configured for each UE set by the eNB may usually be smaller than the quantity of UEs contained in the UE set. That is, finally, the quantity of CSI-RS resources configured by the eNB for a plurality of UEs within a cell covered by the eNB may usually be smaller than the quantity of UEs within the cell covered by the eNB. No repeated description is given in the embodiment of the disclosure. Furthermore, it should be noted that in the embodiment of the disclosure, the definition of a CSI Process may be the same as the definition in a current R12 standard or may be further enhanced. Moreover, each CSI Process may include at least one NZP CSI-RS resource and at least one CSI-IM resource. No repeated description is given in the embodiment of the disclosure.

Further, the physical layer signaling includes, but not limited to, the following signaling: DCI, as long as it can implement real-time indication functions to be implemented in the embodiment of the disclosure. Besides, it should be noted that the MAC signaling includes, but not limited to, MAC IE signaling, as long as it can implement real-time indication functions to be implemented in the embodiment of the disclosure. No repeated description is given in the embodiment of the disclosure.

The embodiment of the disclosure provides a method for indicating a CSI-RS resource. In the technical scheme of the embodiment of the disclosure, a UE may receive a CSI-RS resource indicator issued by an eNB via physical layer signaling or MAC signaling in real time, the CSI-RS resource indicator being used to indicate a CSI-RS resource that can be used by the UE and pertains to one or more CSI-RS resources configured by the eNB for a plurality of UEs within a cell covered by the eNB; and CSI measurement and feedback is performed according to the CSI-RS resource indicated by the eNB via physical layer signaling or MAC signaling in real time. That is, in the technical scheme of the embodiment of the disclosure, CSI-RS configurations of a UE may be quickly and flexibly changed by introducing physical layer signaling or MAC signaling, thereby reducing overheads of a CSI-RS without affecting system performance.

Based on the same inventive concept, the embodiment of the disclosure also provides an eNB. Specific implementation of the eNB may refer to relevant description in the above-mentioned method embodiment, and will not be repeated herein. The eNB may include: a resource configuration unit arranged to configure one or more CSI-RS resources for a plurality of UEs within a cell covered by the eNB; and a resource indication unit arranged to indicate a CSI-RS resource that can be used by at least one of the plurality of UEs and pertains to the one or more CSI-RS resources.

Figure 5:
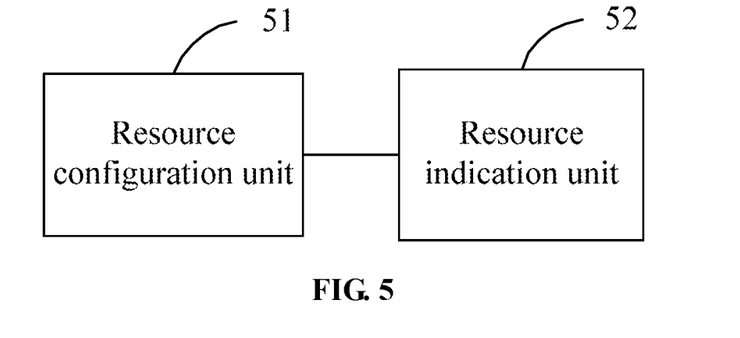
FIG. 5 shows a structure diagram of an eNB according to some embodiments of the disclosure.

Specifically, in one embodiment, as shown in FIG. 5 (showing a structure diagram of the eNB), the eNB may mainly include:

a resource configuration unit 51, which may be arranged to configure one or more CSI-RS resources for a plurality of UEs within a cell covered by the eNB; and a resource indication unit 52, which may be arranged to indicate a CSI-RS resource that can be used by each UE in the plurality of UEs and pertains to the one or more CSI-RS resources via physical layer signaling or MAC signaling in real time, thereby enabling each UE to perform CSI measurement and feedback according to the CSI-RS resource indicated by the eNB via physical layer signaling or MAC signaling in real time.

Alternatively, the CSI-RS resource includes, but not limited to, the following resources:

CSI Process, or NZP CSI-RS resource, or CSI-RS port(s), or DRS.

Further, the resource configuration unit 51 may be specifically arranged to: perform set partitioning on the plurality of UEs to obtain one or more UE sets, and configure a CSI Process Group containing one or more CSI Processes for each UE set, herein when a plurality of CSI Process Groups is configured for the plurality of UEs, CSI Processes contained in any two of the plurality of configured CSI Process Groups are partially the same or totally different.

Further, the resource indication unit 52 may be specifically arranged to indicate, when the eNB configures one or more CSI Process Groups for the plurality of UEs, a CSI-Process that can be used by each UE in the plurality of UEs and pertains to a corresponding CSI Process Group via physical layer signaling or MAC signaling in real time.

Further, the resource indication unit 52 may be specifically arranged to: if it is determined that any UE has a demand for service transmission and a priority of the service transmission is not lower than a set threshold at a next time interval according to the demand for service transmission of the UE, instruct the UE to use, for CSI measurement and feedback, any CSI Process that has not yet been indicated to other UEs within the cell covered by the eNB and pertains to a corresponding CSI Process Group via physical layer signaling or MAC signaling; or, if it is determined that any UE does not have a demand for service transmission, or the UE has a demand for service transmission but the priority of the service transmission is lower than a set threshold at a next time interval according to the demand for service transmission of the UE, instruct the UE not to use, for CSI measurement and feedback, any CSI Process in a corresponding CSI Process Group via physical layer signaling or MAC signaling.

Alternatively, the physical layer signaling includes, but not limited to, the following signaling: DCI.

Correspondingly, the resource indication unit 52 may be specifically arranged to indicate a CSI-RS resource that can be used by each UE in the plurality of UEs and pertains to the one or more CSI-RS resources via an enhanced DCI format in real time, or, indicate a CSI-RS resource that can be used by each UE in the plurality of UEs and pertains to the one or more CSI-RS resources via a newly-added DCI format in real time.

Further, based on the same inventive concept, the embodiment of the present application also provides a UE. Specific implementation of the UE may refer to relevant description in the above-mentioned method embodiment, and will not be repeated herein. The UE may include: a receiving module arranged to receive a CSI-RS resource indicator issued by an eNB, the CSI-RS resource indicator being used to indicate a CSI-RS resource that can be used by the UE and pertains to one or more CSI-RS resources configured by the eNB for a plurality of UEs within a cell covered by the eNB; and an execution module arranged to perform CSI measurement and feedback according to the CSI-RS resource indicated by the eNB.

Figure 6:
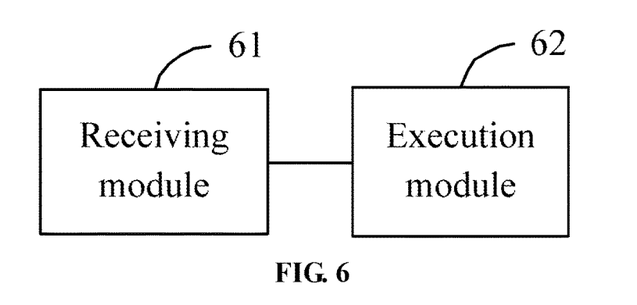
FIG. 6 shows a structure diagram of a UE according to some embodiments of the disclosure.

Specifically, in one embodiment, as shown in FIG. 6 (showing a structure diagram of the UE), the UE may mainly include:

a receiving module 61, which may be arranged to receive a CSI-RS resource indicator issued by an eNB via physical layer signaling or MAC signaling in real time, the CSI-RS resource indicator being used to indicate a CSI-RS resource that can be used by the UE and pertains to one or more CSI-RS resources configured by the eNB for a plurality of UEs within a cell covered by the eNB; and an execution module, which may be arranged to perform CSI measurement and feedback according to the CSI-RS resource indicated by the eNB via physical layer signaling or MAC signaling in real time.

Alternatively, the CSI-RS resource includes, but not limited to, the following resources:

CSI Process, or NZP CSI-RS resource, or CSI-RS port(s), or DRS.

Besides, if each of the one or more CSI-RS resources is a CSI Process, the one or more CSI-RS resources may be usually configured for the plurality of UEs by the eNB in the following manners:

performing set partitioning on the plurality of UEs to obtain one or more UE sets, and configuring a CSI Process Group containing one or more CSI Processes for each UE set, herein when a plurality of CSI Process Groups is configured for the plurality of UEs, CSI Processes contained in any two of the plurality of configured CSI Process Groups are partially the same or totally different.

Figure 7:
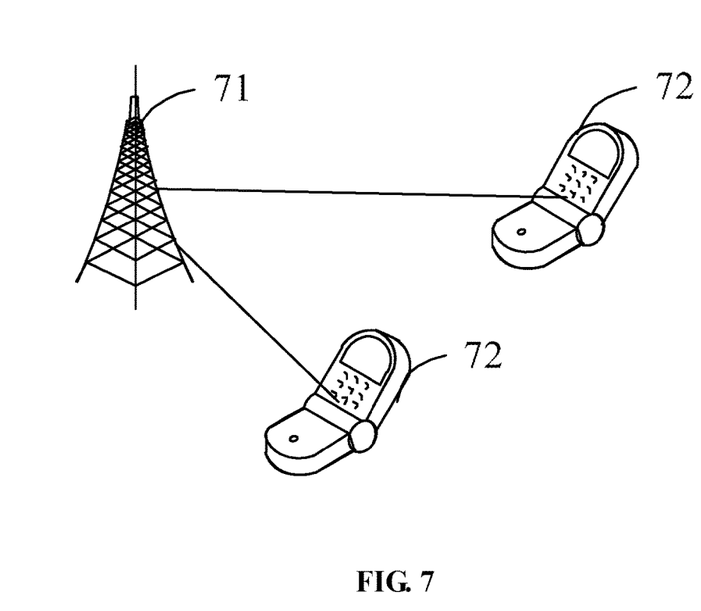
FIG. 7 shows a structure diagram of a system for indicating a CSI-RS resource according to some embodiments of the disclosure.

Further, based on the same inventive concept, the embodiment of the present application also provides a system for indicating a CSI-RS resource. Specific implementation of the system for indicating a CSI-RS resource may refer to relevant description in the above-mentioned method embodiment, and will not be repeated herein. Specifically, FIG. 7 shows a structure diagram of the system for indicating a CSI-RS resource in an embodiment of the disclosure. The system for indicating a CSI-RS resource may mainly include:

an eNB 71, which may be arranged to configure one or more CSI-RS resources for a plurality of UEs within a cell covered by the eNB, and indicate a CSI-RS resource that can be used by each UE in the plurality of UEs and pertains to the one or more CSI-RS resources via physical layer signaling or MAC signaling in real time; and a UE 72, which may be arranged to perform CSI measurement and feedback according to the CSI-RS resource indicated by the eNB via physical layer signaling or MAC signaling in real time.

That is to say, in the technical scheme of the embodiment of the disclosure, CSI-RS configurations of a UE may be quickly and flexibly changed by introducing physical layer signaling or MAC signaling, thereby reducing overheads of a CSI-RS without affecting system performance, particularly, reducing the overheads of the CSI-RS in the presence of a large number of UEs.

Those skilled in the art should understand that the embodiment of the disclosure may be provided as a method, a device (equipment) or a computer program product. Thus, a form of complete hardware embodiment, a form of complete software embodiment or a form of embodiment integrating software and hardware may be adopted in the disclosure. Moreover, a form of computer program product implemented on one or more computer available storage media (including, but not limited to, a disk memory, a CD-ROM an optical memory and the like) containing computer available program codes may be adopted in the disclosure.

The disclosure is described with reference to flowcharts and/or block diagrams of the method, the device (equipment) and the computer program product according to the embodiment of the disclosure. It will be appreciated that each flow and/or block in the flowcharts and/or the block diagrams and a combination of the flows and/or the blocks in the flowcharts and/or the block diagrams may be implemented by computer program instructions. These computer program instructions may be provided for a universal computer, a dedicated computer, an embedded processor or processors of other pieces of programmable data processing equipment to generate a machine, such that a device for implementing functions designated in one or more flows of the flowcharts and/or one or more blocks of the block diagrams is generated via instructions executed by the computers or the processors of the other pieces of programmable data processing equipment.

These computer program instructions may also be stored in a computer readable memory capable of guiding the computers or the other pieces of programmable data processing equipment to work in a specific manner, such that a manufactured product including an instruction device is generated via the instructions stored in the computer readable memory, and the instruction device implements the functions designated in one or more flows of the flowcharts and/or one or more blocks of the block diagrams.

These computer program instructions may also be loaded to the computers or the other pieces of programmable data processing equipment, such that processing implemented by the computers is generated by executing a series of operation steps on the computers or the other pieces of programmable equipment, and therefore the instructions executed on the computers or the other pieces of programmable equipment provide a step of implementing the functions designated in one or more flows of the flowcharts and/or one or more blocks of the block diagrams.

Although alternative embodiments of the disclosure have been described, once obtaining basic creative concepts, those skilled in the art may make additional changes and modifications on these embodiments. Thus, the appended claims are intended to be interpreted as including the alternative embodiments and all changes and modifications falling within the scope of the disclosure.

Apparently, those skilled in the art may make various modifications and variations for the disclosure without departing from the spirit and scope of the disclosure. Thus, if these modifications and variations of the disclosure fall within the scope of claims of the disclosure and an equivalent technology thereof, the disclosure is also intended to include these modifications and variations.

The invention claimed is:

1. A method for indicating a Channel State Information Reference Signal (CSI-RS) resource, comprising:
configuring, by an evolved Node B (eNB), one or more CSI-RS resources for a plurality of User Equipments (UEs) within a cell covered by the eNB; and
indicating a CSI-RS resource that can be used by at least one of the plurality of UEs and pertains to the one or more CSI-RS resources,
wherein the CSI-RS resource comprises the following resources:

CSI Process, or Non-Zero Power (NZP) CSI-RS resource, or CSI-RS port(s), wherein if each of the one or more CSI-RS resources is a CSI Process, the one or more CSI-RS resources are configured for the plurality of UEs by the eNB in the following manners:

performing set partitioning on the plurality of UEs to obtain one or more UE sets, and configuring a CSI Process Group containing one or more CSI Processes for each UE set, wherein when a plurality of CSI Process Groups are configured for the plurality of UEs, CSI Processes contained in any two of the plurality of configured CSI Process Groups are partially the same or totally different.

2. The method according to claim 1, wherein when the eNB configures one or more CSI Process Groups for the plurality of UEs, indicating the CSI-RS resource that can be used by at least one of the plurality of UEs and pertains to the one or more CSI-RS resources comprises:

indicating a CSI-Process that can be used by at least one of the plurality of UEs and pertains to a CSI Process Group corresponding to the at least one UE.

3. The method according to claim 2, wherein indicating the CSI-Process that can be used by at least one of the plurality of UEs and pertains to a CSI Process Group corresponding to the at least one UE comprises:

if any UE has a demand for service transmission and a priority of the service transmission is not lower than a set threshold, instructing the UE to use, for CSI measurement and feedback, any CSI Process that has not yet been indicated to other UEs within the cell covered by the eNB and pertains to a CSI Process Group corresponding to the UE; or, if any UE does not have a demand for service transmission, or the UE has a demand for service transmission but the priority of the service transmission is lower than the set threshold, instructing the UE not to use, for CSI measurement and feedback, any CSI Process in a CSI Process Group corresponding to the UE.

4. The method according to claim 1, wherein indicating the CSI-RS resource that can be used by at least one of the plurality of UEs and pertains to the one or more CSI-RS resources specifically comprises:

indicating the CSI-RS resource that can be used by at least one of the plurality of UEs and pertains to the one or more CSI-RS resources via physical layer signaling or Medium Access Control (MAC) signaling.

5. The method according to claim 4, wherein if the physical layer signaling is a Downlink Control Indicator (DCI), indicating the CSI-RS resource that can be used by at least one of the plurality of UEs and pertains to the one or more CSI-RS resources via physical layer signaling comprises:

indicating the CSI-RS resource that can be used by at least one of the plurality of UEs and pertains to the one or more CSI-RS resources via an enhanced DCI format, or, indicating the CSI-RS resource that can be used by at least one of the plurality of UEs and pertains to the one or more CSI-RS resources via a newly-added DCI format.

6. A method for indicating a Channel State Information Reference Signal (CSI-RS) resource, comprising:

receiving, by a User Equipment (UE), a CSI-RS resource indicator issued by an evolved Node B (eNB), the CSI-RS resource indicator being used to indicate a CSI-RS resource that can be used by the UE and pertains to one or more CSI-RS resources configured by the eNB for a plurality of UEs within a cell covered by the eNB; and performing CSI measurement and feedback according to the CSI-RS resource indicated by the eNB, wherein the CSI-RS resource comprises the following resources:

CSI Process, or Non-Zero Power (NZP) CSI-RS resource, or CSI-RS port(s), wherein if each of the one or more CSI-RS resources is a CSI Process, the one or more CSI-RS resources are configured for the plurality of UEs by the eNB in the following manners:

performing set partitioning on the plurality of UEs to obtain one or more UE sets, and configuring a CSI Process Group containing one or more CSI Processes for each UE set, wherein when a plurality of CSI Process Groups are configured for the plurality of UEs, CSI Processes contained in any two of the plurality of configured CSI Process Groups are partially the same or totally different.

7. An evolved Node B (eNB), comprising:

a processor; and a memory for storing instructions executable by the processor, wherein the processor is arranged to:

configure one or more Channel State Information Reference Signal (CSI-RS) resources for a plurality of User Equipments (UEs) within a cell covered by the eNB; and indicate a CSI-RS resource that can be used by at least one of the plurality of UEs and pertains to the one or more CSI-RS resources, wherein the CSI-RS resource comprises the following resources:

CSI Process, or Non-Zero Power (NZP) CSI-RS resource, or CSI-RS port(s), wherein if each of the one or more CSI-RS resources is a CSI Process, the one or more CSI-RS resources are configured for the plurality of UEs by the eNB in the following manners:

performing set partitioning on the plurality of UEs to obtain one or more UE sets, and configuring a CSI Process Group containing one or more CSI Processes for each UE set, wherein when a plurality of CSI Process Groups are configured for the plurality of UEs, CSI Processes contained in any two of the plurality of configured CSI Process Groups are partially the same or totally different.

8. The eNB according to claim 7, wherein when the eNB configures one or more CSI Process Groups for the plurality of UEs, indicating the CSI-RS resource that can be used by at least one of the plurality of UEs and pertains to the one or more CSI-RS resources comprises:

indicating a CSI-Process that can be used by at least one of the plurality of UEs and pertains to a CSI Process Group corresponding to the at least one UE.

9. The eNB according to claim 8, wherein indicating the CSI-Process that can be used by at least one of the plurality of UEs and pertains to a CSI Process Group corresponding to the at least one UE comprises:

if any one UE has a demand for service transmission and a priority of the service transmission is not lower than a set threshold, instructing the UE to use, for CSI measurement and feedback, any one CSI Process that has not yet been indicated to other UEs within the cell covered by the eNB and pertains to a CSI Process Group corresponding to the UE; or, if any one UE does not have a demand for service transmission, or the UE has a demand for service transmission but the priority of the service transmission is lower than the set threshold, instructing the UE not to use, for CSI measurement and feedback, any CSI Process in a CSI Process Group corresponding to the UE.

10. The eNB according to claim 7, wherein indicating the CSI-RS resource that can be used by at least one of the plurality of UEs and pertains to the one or more CSI-RS resources specifically comprises:

indicating the CSI-RS resource that can be used by at least one of the plurality of UEs and pertains to the one or more CSI-RS resources via physical layer signaling or Medium Access Control (MAC) signaling.

11. The eNB according to claim 10, wherein if the physical layer signaling is a Downlink Control Indicator (DCI), indicating the CSI-RS resource that can be used by at least one of the plurality of UEs and pertains to the one or more CSI-RS resources via physical layer signaling comprises:

indicating the CSI-RS resource that can be used by at least one of the plurality of UEs and pertains to the one or more CSI-RS resources via an enhanced DCI format, or, indicating the CSI-RS resource that can be used by at least one of the plurality of UEs and pertains to the one or more CSI-RS resources via a newly-added DCI format.

12. A User Equipment (UE), comprising:
a processor; and
a memory for storing instructions executable by the processor,
wherein the processor is arranged to:
receive a Channel State Information Reference Signal (CSI-RS) resource indicator issued by an evolved Node B (eNB), the CSI-RS resource indicator being used to indicate a CSI-RS resource that can be used by the UE and pertains to one or more CSI-RS resources configured by the eNB for a plurality of UEs within a cell covered by the eNB; and
perform CSI measurement and feedback according to the CSI-RS resource indicated by the eNB,
wherein the CSI-RS resource comprises the following resources:
CSI Process, or Non-Zero Power (NZP) CSI-RS resource, or CSI-RS port(s),
wherein if each of the one or more CSI-RS resources is a CSI Process, the one or more CSI-RS resources are configured for the plurality of UEs by the eNB in the following manners:
performing set partitioning on the plurality of UEs to obtain one or more UE sets, and configuring a CSI Process Group containing one or more CSI Processes for each UE set,
wherein when a plurality of CSI Process Groups are configured for the plurality of UEs, CSI Processes contained in any two of the plurality of configured CSI Process Groups are partially the same or totally different.

* * * * *